(12) United States Patent
Leone et al.

(10) Patent No.: US 9,279,373 B2
(45) Date of Patent: Mar. 8, 2016

(54) VAPOR PURGING OCTANE SEPARATION SYSTEM

(71) Applicant: Ford Global Technologies, LLC, Dearborn, MI (US)

(72) Inventors: Thomas G. Leone, Ypsilanti, MI (US); James Eric Anderson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 14/019,362

(22) Filed: Sep. 5, 2013

(65) Prior Publication Data
US 2015/0059700 A1    Mar. 5, 2015

(51) Int. Cl.
*F02D 19/08*    (2006.01)
*F02D 41/00*    (2006.01)
(Continued)

(52) U.S. Cl.
CPC .............. *F02D 19/084* (2013.01); *F02D 19/08* (2013.01); *F02D 37/02* (2013.01); *F02D 41/0025* (2013.01); *F02D 41/0032* (2013.01); *F02D 41/0042* (2013.01); *F02D 41/1456* (2013.01);
(Continued)

(58) Field of Classification Search
CPC ..... F02D 19/08; F02D 19/084; F02D 19/087; F02M 25/0854
USPC ......... 123/529, 516, 518, 519, 299, 300, 304, 123/575–578; 210/175; 321.6
See application file for complete search history.

(56) References Cited

U.S. PATENT DOCUMENTS

| 3,254,620 A | 6/1966 | Cannon |
| 3,640,894 A | 2/1972 | Sampson |

(Continued)

FOREIGN PATENT DOCUMENTS

| EP | 1443202 A2 | 8/2004 |
| JP | H05312115 A | 11/1993 |

(Continued)

OTHER PUBLICATIONS

Berkemeier, Oliver et al., "Direct-Injection Internal Combustion Engine with Outwardly Opening Injection Nozzle, and Method for Operating an Internal Combustion Engine of Said Type," U.S. Appl. No. 13/924,329, filed Jun. 21, 2013, 26 pages.

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

A method for controlling an engine supplied with multiple fuels in which the vapor purge flow into the engine from multiple vapor storage devices each coupled to a respective, but equal number of multiple fuel tanks controlled to have the same proportion of total vapors purged as a proportion of liquid fuel delivered to the engine from said respective one of the said multiple fuel tanks. The method includes increasing the delivery of fuel from one of the multiple fuel tanks containing fuel with the highest-octane rating of all the fuel tanks when the vapor storage canister coupled to the fuel tank with the highest-octane fuel is not being purged of its fuel vapors. Additionally, the method further comprises a feedback control responsive to an exhaust gas oxygen sensor to adjust said fuel delivered from said multiple fuel tanks to the engine to maintain engine air-fuel ratio around stoichiometry.

20 Claims, 4 Drawing Sheets

(51) Int. Cl.
*F02D 41/14* (2006.01)
*F02P 5/152* (2006.01)
*F02D 37/02* (2006.01)
*F02M 25/08* (2006.01)
*F02D 35/02* (2006.01)
*F02D 41/38* (2006.01)

(52) U.S. Cl.
CPC ............... *F02P 5/152* (2013.01); *F02D 19/087* (2013.01); *F02D 35/027* (2013.01); *F02D 2041/3881* (2013.01); *F02D 2200/0611* (2013.01); *F02M 25/0854* (2013.01)

(56) References Cited

U.S. PATENT DOCUMENTS

| | | | |
|---|---|---|---|
| 4,210,103 A * | 7/1980 | Dimitroff et al. | 123/1 A |
| 4,391,716 A | 7/1983 | McCurry | |
| 5,237,978 A | 8/1993 | Bailey | |
| 5,408,874 A | 4/1995 | Fleck, Sr. et al. | |
| 6,450,193 B1 | 9/2002 | Constantinou | |
| 6,622,663 B2 | 9/2003 | Weissman et al. | |
| 6,622,664 B2 * | 9/2003 | Holder et al. | 123/3 |
| 6,711,892 B2 | 3/2004 | Tamura et al. | |
| 7,278,396 B2 | 10/2007 | Leone et al. | |
| 7,287,492 B2 | 10/2007 | Leone et al. | |
| 7,426,907 B2 | 9/2008 | Dearth et al. | |
| 7,584,740 B2 * | 9/2009 | Boyarski | 123/304 |
| 7,647,916 B2 | 1/2010 | Leone et al. | |
| 7,845,315 B2 * | 12/2010 | Leone et al. | 123/1 A |
| 8,065,979 B2 | 11/2011 | Leone et al. | |
| 8,118,009 B2 | 2/2012 | Pursifull et al. | |
| 8,127,745 B2 | 3/2012 | Surnilla et al. | |
| 8,141,356 B2 | 3/2012 | Leone et al. | |
| 8,211,300 B2 * | 7/2012 | Partridge et al. | 210/181 |
| 8,267,066 B2 | 9/2012 | Surnilla et al. | |
| 8,267,074 B2 | 9/2012 | Leone et al. | |
| 8,280,610 B2 | 10/2012 | Santoso et al. | |
| 8,312,867 B2 | 11/2012 | Pursifull et al. | |
| 8,353,269 B2 | 1/2013 | Kasseris et al. | |
| 8,375,899 B2 | 2/2013 | Leone et al. | |
| 8,387,591 B2 | 3/2013 | Surnilla et al. | |
| 8,550,059 B2 | 10/2013 | Makarov et al. | |
| 2008/0006333 A1 | 1/2008 | Partridge et al. | |
| 2009/0078239 A1 | 3/2009 | Hill et al. | |
| 2010/0155315 A1 * | 6/2010 | Partridge et al. | 210/149 |
| 2010/0229966 A1 | 9/2010 | Elwart et al. | |
| 2012/0067033 A1 * | 3/2012 | Leone et al. | 60/309 |
| 2013/0014731 A1 | 1/2013 | Pursifull et al. | |
| 2013/0019593 A1 | 1/2013 | Jacques et al. | |

FOREIGN PATENT DOCUMENTS

| | | | |
|---|---|---|---|
| JP | 407019124 A | | 1/1995 |
| JP | 2006046144 A * | | 2/2006 |
| JP | 02006257907 A | | 9/2006 |
| SU | 731020 A1 | | 4/1980 |
| SU | 848725 A1 | | 7/1981 |
| WO | 03029624 A1 | | 10/2003 |
| WO | 2008067623 A1 | | 6/2008 |

OTHER PUBLICATIONS

Leone, Thomas G., "Octane Separation System and Operating Method," U.S. Appl. No. 13/973,879, filed Aug. 22, 2013, 80 pages.

Leone, Thomas G., "Octane Separation System and Operating Method," U.S. Appl. No. 13/973,872, filed Aug. 22, 2013, 80 pages.

Leone, Thomas G., "Octane Separation System and Operating Method," U.S. Appl. No. 13/973,886, filed Aug. 22, 2013, 80 pages.

* cited by examiner

VAPOR PURGING OCTANE SEPARATION SYSTEM

FIELD

The field of the disclosure relates to fuel vapor storage and vapor purge control for a vehicle.

BACKGROUND AND SUMMARY

Engines that operate on multiple fuels are being developed. The engines may operate on mixtures including gasoline/ethanol, gasoline/compressed natural gas (CNG), diesel/gasoline, or diesel/ethanol. Each of these fuels may be stored in a separate fuel tank on board a vehicle.

It also has been proposed to separate fuels that have been combined into a single fuel mixture for the purpose of improving vehicle performance and fuel economy. One fuel mixture that may be separated into its individual component fuels is a gasoline\ethanol fuel mixture such as E10 (90% gasoline and 10% ethanol), E20, or E85. Furthermore, gasoline may be separated into a low-octane component gasoline and a high-octane component gasoline on board the vehicle. The separated fuels or fuel components may be stored in separate fuel tanks on board the vehicle.

U.S. Patent Applications 2008/0006333 A1 and 2010/0229966 A1 describes fuel systems that include multiple fuel tanks for storing different types of fuels. Fuel vapors from the multiple fuel tanks are routed to a single fuel vapor storage canister to limit airborne emissions. However, it may be more difficult to control an engine air-fuel ratio with such a system since a wider range of fuel vapors may be stored in the fuel vapor storage canister because of differences between fuels stored in the multiple fuel tanks. Further, the inventors herein have recognized that the fuel vapors from one tank may be reabsorbed into other fuel tanks in the fuel system. Re-absorption of separated fuel components into fuel tanks may change fuel properties in each of the multiple fuel tanks. If re-absorption were to occur, re-separating fuel from the fuel tanks may result in increased energy consumption, or the engine may be operated less efficiently to use the combined fuel that includes fuel from different fuel tanks.

The inventors herein have recognized that fuels having different properties may be stored in separate fuel tanks to leverage desirable properties of the different fuels. One important property is that the fuels will generate vapors, with each vapor having unique properties, including, but not limited to, octane ratings or air-fuel ratios. By having separate fuel vapor storage canisters in fluidic communication with each fuel tank, each fuel vapor storage canister may also contain fuel vapors having unique properties, including, but not limited to, octane ratings and air-fuel ratio. Additionally, the fuel vapor properties of fuel stored in a fuel vapor storage canisters may be the same as that of fuel vapors held in the fuel tank that is in fluidic communication with the fuel vapor storage canister. As such, the inventors have devised engine operating and purge controls to take advantage of the different fuel vapor properties of different fuel tanks and different fuel vapor storage canisters.

In one example described herein, the inventors have provided control over multiple vapor purge flows into the engine from multiple fuel vapor storage devices that are in fluidic communication with a respective, but equal number of multiple fuel tanks; each of the multiple fuel vapor purge flows are controlled to be in a same proportion of total fuel vapors purged as the proportion of liquid fuel of the total liquid fuels supplied from the respective fuel tanks to the engine. This novel type of control allows the unique properties of each fuel to be fully utilized, both as a liquid and as a vapor. For example, the high-octane vapor phase fuel may be purged into the engine in proportion to the high-octane liquid phase fuel currently being injected into the engine. Otherwise, by mixing vapors from each fuel tank together in a single canister, as shown in prior approaches, the advantage of the high-octane vapor phase fuel may not be realized. Additionally, by purging fuel vapors proportionate to use of similar liquid phase fuel, engine air-fuel ratio disturbances may be reduced since the overall stoichiometric fuel ratio remains constant. In this way, fuel properties may be leveraged to benefit engine operation. Further, engine air-fuel ratio control during fuel vapor purging of multiple fuel types may be improved.

The present description may provide several advantages. In particular, the approach may allow stored fuel vapors to be used to improve engine operation in a similar way that one liquid fuel may be used to improve engine performance over a different liquid fuel. Further, the approach may improve engine air-fuel ratio control by allowing a stoichiometric air-fuel ratio to remain constant. Further still, the approach may reduce the possibility of separated fuels from being reabsorbed into fuel having different properties.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
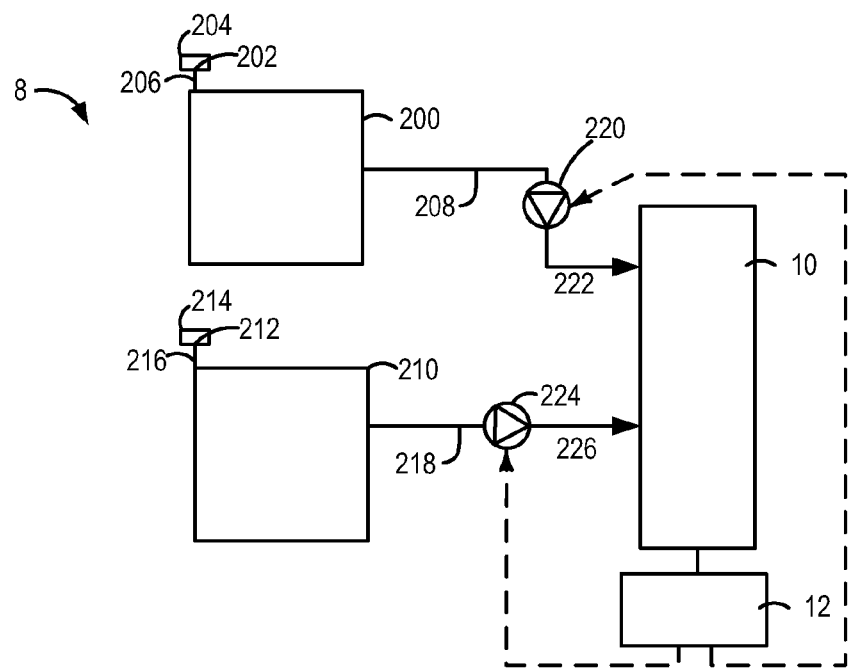
FIGS. 2-3 show illustrations of example multi-fuel systems.
Figure 3:
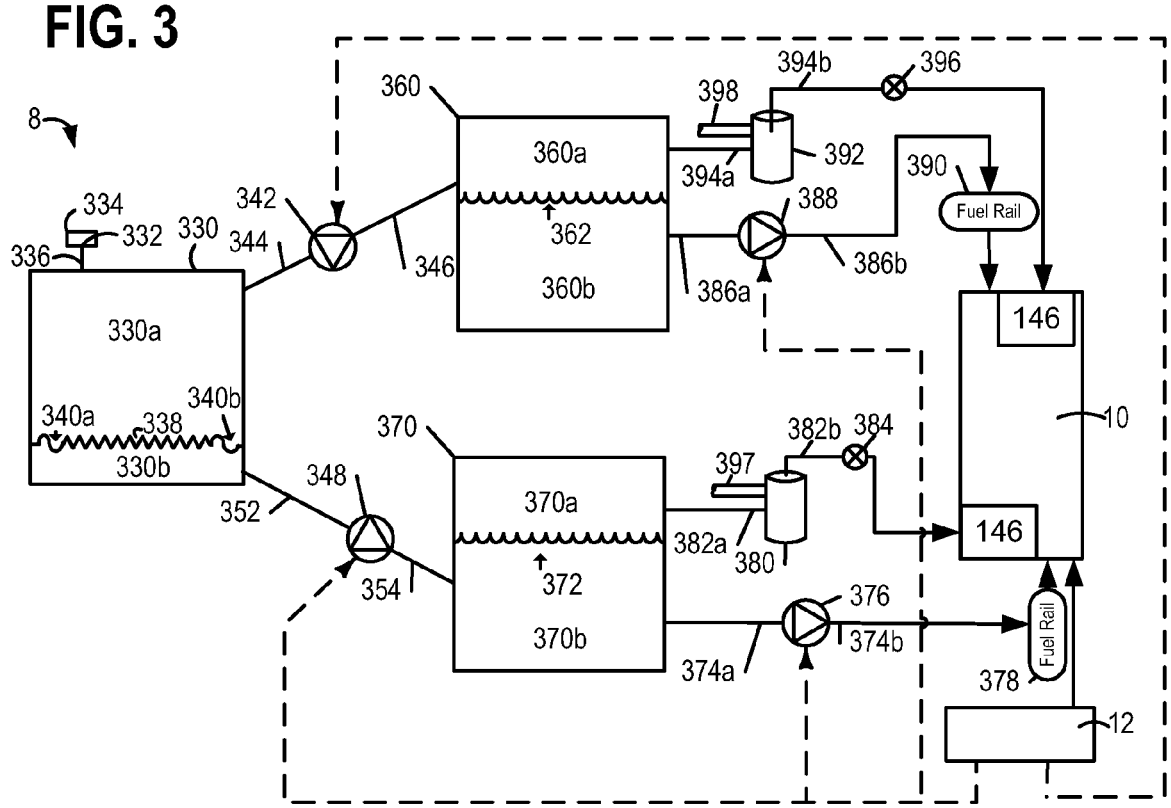
Figure 4:
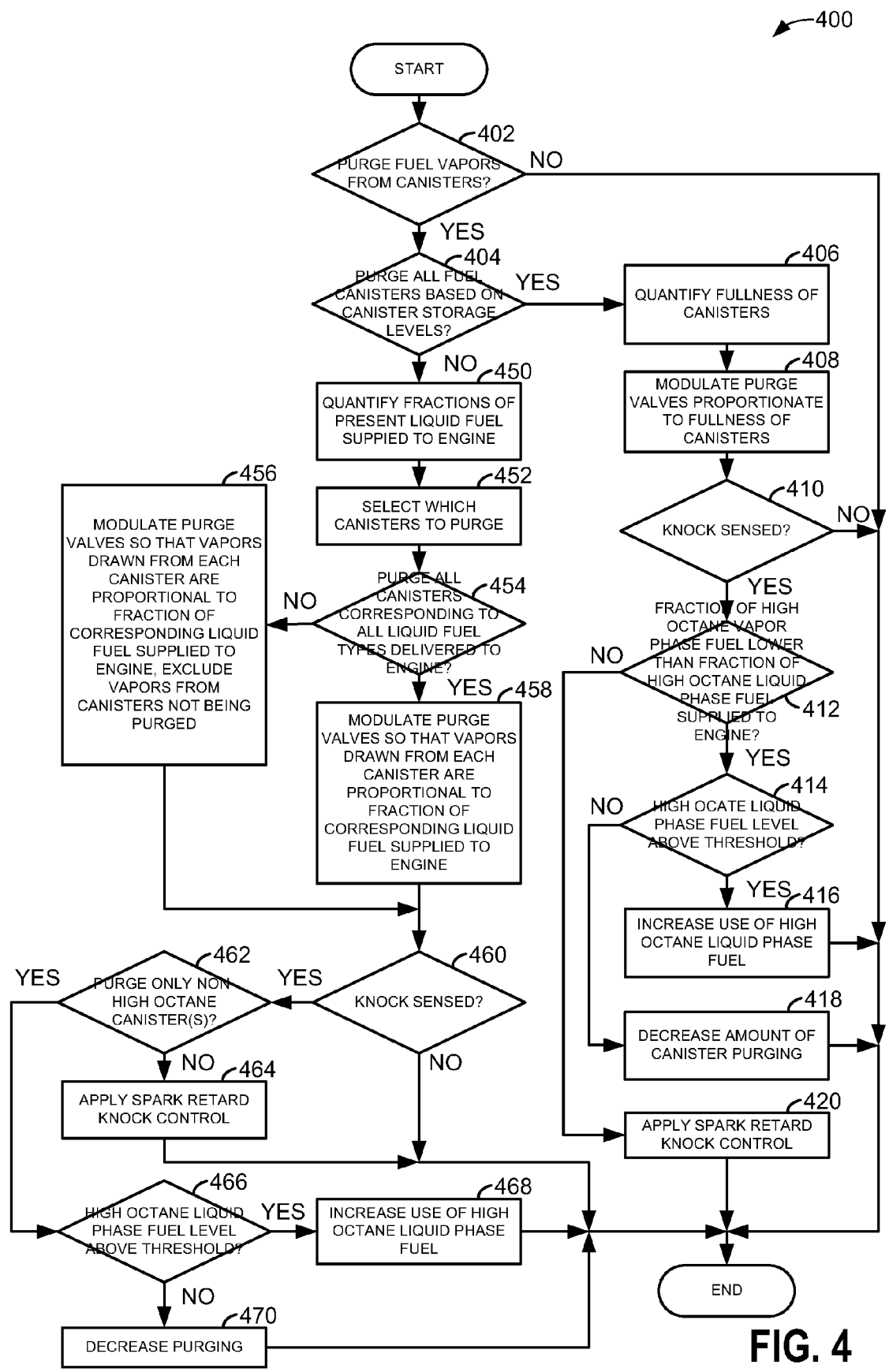
FIG. 4 shows a flowchart depicting an example purge control strategy for a multi-fuel system.
Figure 5:
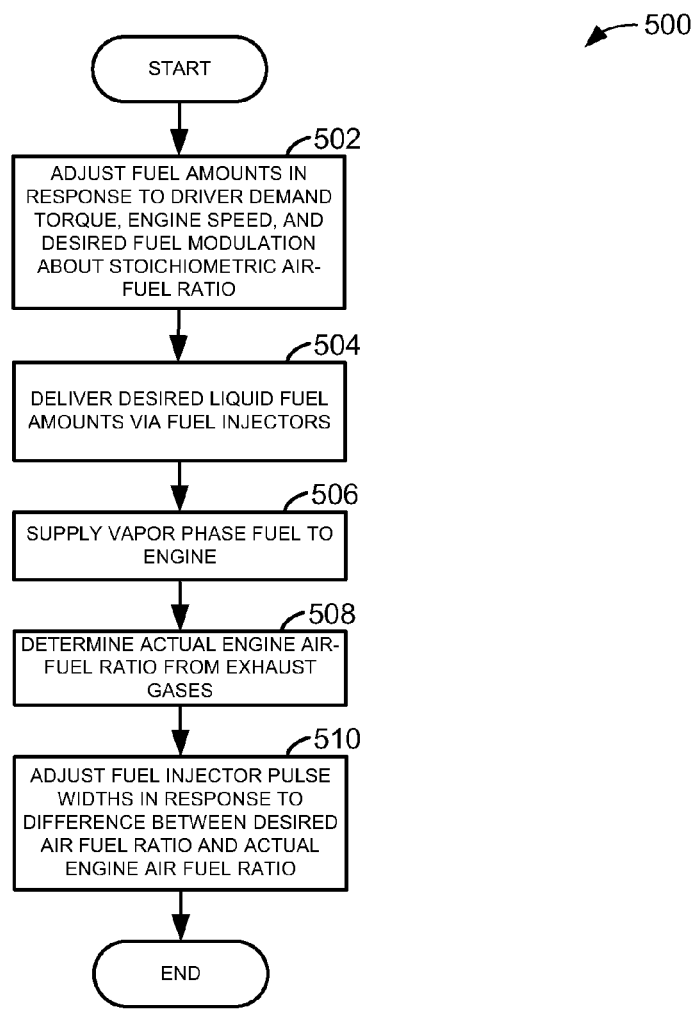
FIG. 5 shows a flowchart of closed-loop air-fuel ratio control including fuel vapor purging.

The following description relates to systems and methods of improving fuel usage in engines containing multiple fuel tanks. Because fuels may be separated into multiple fuel tanks based on different properties, fuels may be utilized most effectively in an internal combustion engine, such as the one illustrated in FIG. 1. FIGS. 2-3 illustrate example multiple fuel systems. The multiple fuel systems may provide for separating different types of fuels from fuel mixtures, and fuel vapors from different fuels may be stored in individual fuel canisters. Fuel vapors stored in canisters may be purged from the canisters to an engine in a way that utilizes each fuel's unique properties. FIG. 4 shows a method for purging different fuels stored in different storage canisters. Additionally, the method for purging fuel vapor storage canisters accounts for conditions where engine knock may be present. FIG. 5 illustrates closed-loop fuel control including purging different types of fuel vapor at the same time.

Figure 1:
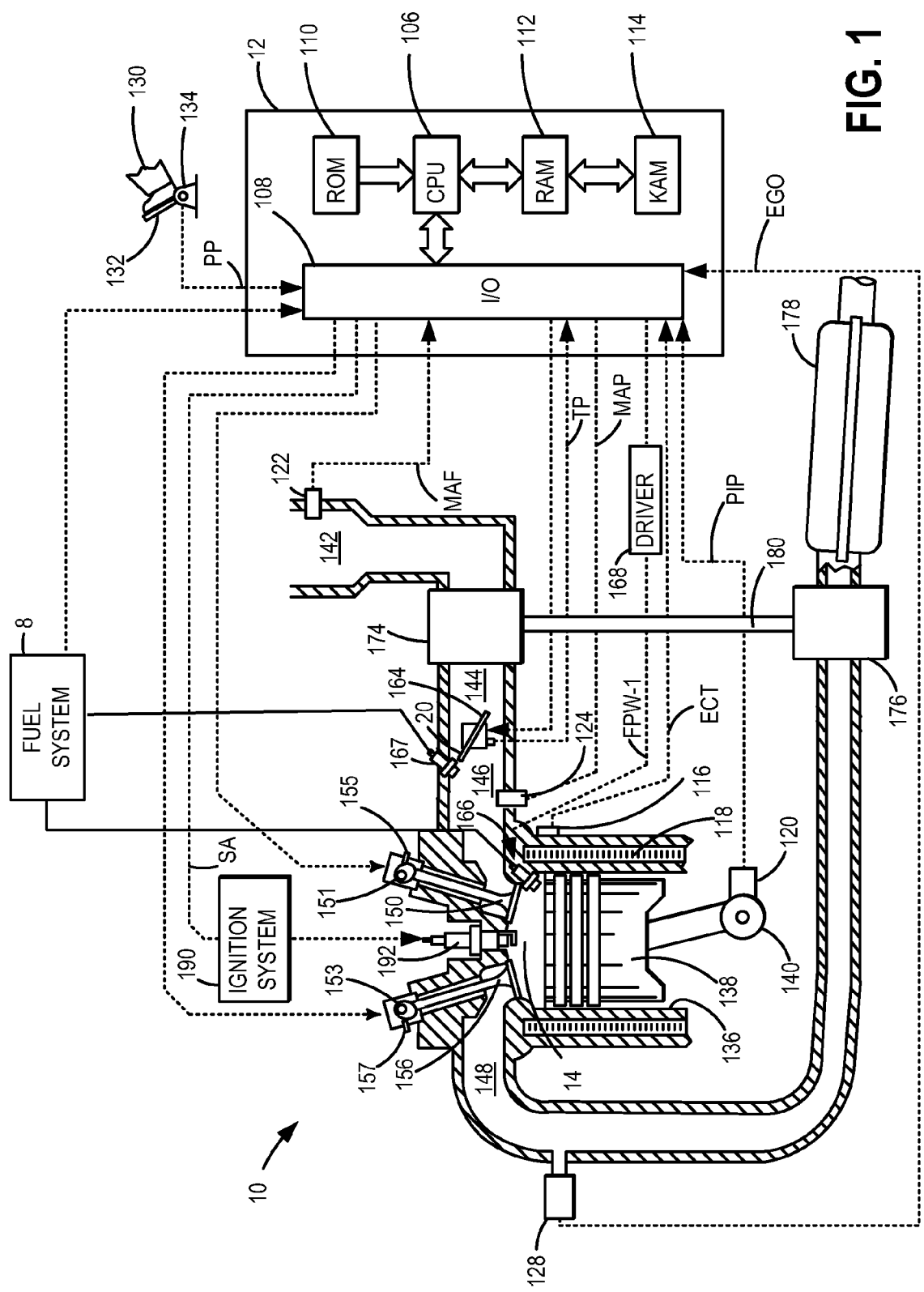
FIG. 1 shows an example of an internal combustion engine.

FIG. 1 depicts an example of an internal combustion engine 10. Electrical control lines are depicted as dashed lines. Fuel lines and mechanical devices are depicted with solid lines.

Engine 10 may receive control parameters from a control system, which includes a controller 12, and input from a vehicle operator 130 via an input device 132. In this example, input device 132 includes an accelerator pedal and a pedal position sensor 134 for generating a proportional pedal position signal (PP). Cylinder 14 of engine 10 may include combustion chamber walls 136 with piston 138 positioned therein. Piston 138 may be coupled to crankshaft 140, such that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10, in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may reside along an intake passage of the engine in order to vary the flow rate and/or pressure of intake air provided to the engine cylinders. For example, throttle 20 may be disposed downstream of compressor 174 as shown in FIG. 1, or alternatively it may be provided upstream of compressor 174.

Exhaust passage 148 can receive exhaust gases from other cylinders of engine 10, including cylinder 14. Exhaust gas sensor 128 is shown coupled to exhaust passage 148 upstream of emission control device 178. Exhaust gas sensor 128 may be one among various suitable sensors for providing an indication of exhaust gas air-fuel stoichiometric ratio, including but not limited to a linear oxygen sensor or universal or wide-range exhaust gas oxygen (UEGO), two-state oxygen sensor (EGO), heated EGO (HEGO), $NO_x$, HC, or CO sensor. Emission control device 178 may be a three way catalyst (TWC), a $NO_x$ trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128.

Each cylinder of engine 10, including cylinder 14, may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative examples, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is provided due to its effect on charge temperature.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some examples, spark plug 192 may be omitted, such as where engine 10 may initiate combustion by auto-ignition or by injection of fuel as may be the case with some compression ignition or diesel engines.

In some examples, each cylinder of engine 10, including cylinder 14, may be configured with multi-port fuel injection for providing fuel thereto. For example, cylinder 14 is shown including two fuel injectors 166 and 167. Fuel injector 166 is shown in direct fluidic communication with cylinder 14 for injecting fuel directly therein in proportion to the pulse width of signal FPW received from controller 12 via electronic driver 168. In this manner, fuel injector 166 provides what is known as direct injection of fuel into combustion chamber 14. While FIG. 1 shows injector 166 as a side injector, it may also be located overhead of the piston, such as near the position of spark plug 192. Alternatively, the injector may be located overhead and near the intake valve to improve mixing. Fuel may be delivered to fuel injector 166 from a fuel system 8 including fuel tanks, fuel pumps, and/or a fuel rail (as described further in FIG. 2). Further, while not shown, the fuel tanks may have a pressure transducer providing a signal to controller 12.

In a high pressure fuel system, such as the one described in the current description, fuel is pressurized. When it is directly injected into the combustion cylinder, it experiences a change of phase, namely going from a liquid to a gas. This phase change provides cooling to the combustion chamber, and therefore the engine is less sensitive to knock, and accordingly, allows a higher boosting compression ratio with a more advanced ignition timing.

Additionally, in this example, a fuel injector 167 is arranged in an intake port or in intake manifold 146 in a configuration known as port injection of fuel into the intake port upstream of combustion chamber 14. Fuel injector 167 is located downstream from throttle 20 within the intake manifold 146; such a position for fuel injector 167 may improve mixing and combustion and part load pumping work. Fuel may be delivered to fuel injector 167 from a fuel system 8 including fuel tanks, fuel pumps, and/or a fuel rail (as described further in FIG. 2). Further, while not shown, the fuel tanks may have a pressure transducer providing a signal to controller 12. Additionally, other examples may illustrate other suitable fuel systems.

In addition to better mixing and combustion and pumping work within cylinder 14, additional advantages to utilizing port injection, include, reducing of system costs, reduction in the required fuel rail pressure (as high fuel rail pressure can reduce fuel economy due to parasitic losses of the fuel pump), and reducing packaging issues (as multiple direct injectors may require compromised valve sizes and/or angles, intake or exhaust port shapes, etc.).

Fuel may be delivered by the injector to the cylinder during a single cycle of the cylinder. Further, the distribution and/or relative amount of fuel delivered from the injector may vary with operating conditions, such as air charge temperature. Furthermore, for a single combustion event, multiple injections of delivered fuel may be performed per cycle. Multiple injections may be performed during the compression stroke, intake stroke, or while the intake valve is closed (with port injection), or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may include a multitude of fuel tanks containing fuels that have been separated based on different fuel qualities, as described herein. These fuel qualities may include, but are not limited to, different octane ratings, different vapor pressures, different heat of vaporizations, different alcohol contents, different fuel types such as gasoline, diesel, compress natural gas (CNG), etc., and/or combinations thereof. In one example, further described herein, fuels containing liquid and vapors of different octane ratings may include a high-octane, intermediate-octane, and low-octane fuel.

Controller 12 is shown in FIG. 1 as a microcomputer, including microprocessor unit (CPU) 106, input/output ports 108, an electronic storage medium for executable programs and calibration values shown as read only memory (ROM) 110 (e.g., non-transitory memory) in this particular example, random access memory (RAM) 112, keep alive memory (KAM) 114, and a data bus. Controller 12 may receive signals from various sensors coupled to engine 10, in addition to those signals previously discussed, including measurement of inducted mass air flow (MAF) from MAF sensor 122; engine coolant temperature (ECT) from temperature sensor 116 coupled to cooling sleeve 118; a profile ignition pickup signal (PIP) from Hall effect sensor 120 coupled to crankshaft 140, throttle position (TP) from a TP sensor, and absolute manifold pressure signal (MAP) from sensor 124. Engine speed signal, RPM, may be generated by controller 12 from signal PIP. Manifold pressure (MAP) signal from a MAP sensor may also be used to provide an indication of vacuum, or pressure, in the intake manifold.

Referring now to FIG. 2, it shows a first schematic depiction of a vehicle's fuel system 8. Fuel lines and fuel system components are illustrated with solid lines. Electrical lines are illustrated with dashed lines.

One fuel system, as illustrated in FIG. 2, includes two separate fuels or fuel blends pumped into two independent fuel tanks through filling ports. For example, a first fuel (e.g., E85) may be pumped from an external source, such as a filling station, into a first fuel tank 200 via port 202. Fuel tank 200 may include a fuel cap 204, a passage 206, and a valve (not shown), allowing the fuel to be directly pumped into fuel tank 200.

A second fuel, e.g., gasoline, may be pumped from an external source, such as a filling station, into a second fuel tank 210 via port 212. Second fuel tank 210 is separate from the first fuel tank 200. Fuel tank 210 may include a fuel cap 214, a passage 216, and a valve (not shown), allowing the fuel to be directly pumped into fuel tank 210.

In accordance with the current description, fuel from tanks 200 and 210 are fed into engine 10 using separate fuel injectors. For example, fuel from fuel tank 200 may be in fluidic communication with a first fuel pump 220 via fuel line 208. Fuel pump 220 is electronically actuated by controller 12, and may be directly connected to the direct fuel injector 166 (as shown in FIG. 1), via fuel conduit 222, for injection into the cylinder 14 of engine 10. Conversely, the fuel from fuel tank 210 may be in fluidic communication with a second fuel pump 224 by fuel line 218. In this example, fuel pump 224 is electronically actuated by controller 12 and may be directly connected to the port fuel injector 167 (as shown in FIG. 1), via fuel conduit 226, for injection into the intake port prior to entering cylinder 14 of engine 10.

In other examples, other suitable fuels may be used to fill fuel tanks 200 and 210. Additionally, suitable mechanisms may be used to allow the separate fuels or blended fuel mixtures to be directed into fuel tanks 200 and 210. For example, the fuel injectors may consist of additional port injectors, equal to the number of the fuel tanks coupled to the respective port injectors. In other examples, valves may be used to send fuel from either tank 200 or 210 to either direct injectors or port injectors, and to vary which fuel is sent to which injectors depending on operating conditions. Additionally, the timing of the fuel injection may be applied in such a way to utilize the charge cooling effects of the mixture, in order to reduce knock limits on engine operation.

Referring now to FIG. 3, another approach for fuel system 8 may include a fuel or fuel blend that may be separated into different fuel tanks based on different fuel properties on board the vehicle. For example, as described by the schematic depiction shown in FIG. 3, a fuel blend (e.g., E10, E15, or E85) may be separated into its individual fuel components (e.g., ethanol and gasoline), which are partitioned into different fuel tanks. The fuel blend may be pumped into a first fuel tank 330 via port 332 from an external source, such as a filling station. Fuel port 332 may include a fuel cap 334, a passage 336, and a valve (not shown), allowing the fuel to be directly pumped into fuel tank 330. The fuel blend in fuel tank 330 may be partitioned into separate fuel tanks on board the vehicle, while the vehicle is in operation.

A number of methods can be used to separate the fuel blend from fuel tank 330, including, but not limited to, a selective permeable membrane or an evaporation apparatus. For example, if a selective permeable membrane 338 is used to separate the fuel within fuel tank 330, an upper chamber 330*a* and a lower chamber 330*b* are formed, and as such, the membrane may be enclosed by fuel tank 330. The substances in the fuel blend within the upper chamber may include the gasoline from the fuel blend alone, or a mixture, such as alcohol/gasoline. The lower chamber may contain alcohol alone (e.g., ethanol), or a mixture, such as gasoline/alcohol. In other examples, a pump may be used to force fuel through a separation device, which may be located outside of fuel tank 330.

The membrane 338, as described in prior art, and as shown mounted in a non-limiting, horizontal configuration in FIG. 3, may include one or more membrane elements. A membrane element can include a selectively permeable membrane element that permits at least one component of a fuel blend to pass through the membrane element from the upper portion to the lower portion (or vice versa) at a greater rate than at least one other component of the fuel blend.

As a non-limiting example, the membrane element can be configured to permit at least the alcohol component of an E85 fuel blend, or other gasoline/alcohol fuel blend, to permeate through the membrane element from the upper portion to the lower portion of the fuel tank 330 at the highest rate. In this way, the membrane element can provide a fuel separation function, whereby a permeant includes a higher concentration of the alcohol component and a lower concentration of the gasoline component than the initial fuel mixture due in part to the selectivity of the membrane element, where the term permeant may be used to describe the fuel component or components that permeate the membrane element.

The membrane may be configured as such to provide increased surface area for a given fuel tank size, where a larger surface area allows a greater amount of alcohol to be separated from the blended fuel mixture, as desired. In this example, the membrane is pleated to form an accordion-like structure. Additionally, the membrane may be supported by a porous surface such as, but limited to, zirconia. In other examples, the membrane may be honeycomb-shaped. Furthermore, the membrane may include a number of different layers of membrane elements which may assist in the separation performance.

In some examples, the membrane element may include a polymer and/or other suitable material that permits an alcohol component to permeate through the membrane element at a higher rate than the gasoline component. For example, the membrane element may include polyethersulfone, which contains both polar and nonpolar characteristics, with the polar interaction dominant to an outer section of the membrane element, thus permitting alcohol to permeate the membrane element to a greater extent than the gasoline. Additionally or alternatively, the membrane element may include a nanofiltration material that utilizes molecule size exclusion and/or chemical selectivity to separate an alcohol component from a gasoline component within the fuel blend.

Additionally, in this example, flexible joints 340a and 340b, are coupled to the membrane, allowing the position of the membrane to be passively adjusted as the volume or relative volume of the fluids in both the upper and/or lower portion of the fuel tank change. In this manner, the volume and/or relative volume of the various substances in the upper and/or lower portion of the fuel tank can be adjusted during diffusion or during refueling of the fuel tank, without requiring additional space in the fuel tank. In alternate examples, the membrane may be actively adjusted via a height adjustment mechanism in response to a change in the volume or relative volume of the knock suppressing substance(s) and/or gasoline in the upper and/or lower portion of the fuel tank.

Because the fuel blend within fuel tank 330 has been separated into different fuel components within chambers 330a and 330b, the fuel components have different properties. For example, the upper chamber 330a of fuel tank 330 may contain gasoline, while the lower chamber 330b of fuel tank 330 may contain ethanol. Having different properties, such as octane ratings and vapor pressures, different fuels from the upper 330a and lower 330b chambers of fuel tank 330 may be directed to different fuel tanks in order to later utilize the different fuels more advantageously in the operation of engine 10 and for suppression of engine knock.

Fuel pumps may be provided to remove fuel from the upper 330a and lower 330b chambers of fuel tank 330. For example, the upper chamber 330a of fuel tank 330 may be in fluid communication with first separate fuel tank 360 via fuel pump 342 and fuel line 344. In this example, fuel pump 342 is electronically actuated by controller 12. Fuel pump 342 may be in direct fluidic communication with first separate fuel tank 360, as illustrated in FIG. 3, via fuel conduit 346. Conversely, the lower chamber 330b of fuel tank 330 may be in fluidic communication with a second separate fuel tank 370 via fuel pump 348 and fuel line 352. In this example, fuel pump 348 is electronically actuated by controller 12. Fuel pump 348 may be in direct fluidic communication with second separate fuel tank 370, as illustrated in FIG. 3, via fuel conduit 354.

Sensors and gauges (not shown) may be coupled to fuel tank 330, including, but not limited to, concentration sensors and/or fuel gages. A concentration sensor would determine the concentration of one or more substances in the fuel blended mixture enclosed by either the upper 330a or lower 330b chambers of fuel tank 330. Additionally, fuel gages, including, but not limited to, a float gauge may be included with fuel tank 330 in order to determine the amount of fuel in either the upper 330a or lower 330b chamber of fuel tank 330.

Once the fuels have been separated into fuel tanks 360 and 370, respectively, the fuels can be utilized effectively based on their own unique properties. One such unique property is that the fuels may have different vapor pressures. As such, ethanol in fuel tank 370 has a vapor pressure, and therefore, some of the liquid phase fuel will evaporate into a vapor phase fuel, thereby separating the fuel into a vapor phase fuel 370a and a liquid phase fuel 370b. The vapor phase fuel 370a and the liquid phase fuel 370b may co-exist, and are shown in FIG. 3 to be separated by a liquid-vapor line, illustrated by wave-lines 372.

The vapor pressure of the alcohol present in fuel tank 370, as separated from the fuel blend in fuel tank 330, is dependent on the alcohol introduced in the fuel blend. For example, the vapor pressure of short-chain alcohols (e.g., methanol) are higher than the vapor pressure longer chain alcohols (e.g., butanol), thereby forming the vapor layer of fuel.

The gasoline in fuel tank 360 also has a vapor pressure, and as such, a portion of the liquid phase fuel will evaporate into vapor phase fuel, thereby separating the fuel into a vapor phase fuel 360a and a liquid phase fuel 360b. The vapor phase fuel 360a and the liquid phase fuel 360b may co-exist, and are shown in FIG. 3 to be separated by a liquid-vapor line, illustrated by wave-lines 362.

In accordance with the present description, the properties of the vapor phase fuels and the liquid phase fuels auto-generated within fuel tanks 360 and 370, respectively, can be utilized separately to suppress knock in engine 10. To that end, the liquid fuel from the fuel tank 370 (e.g., ethanol) is directly injected into cylinder 14 of the engine through a fuel injector in direct communication with cylinder 14, while the liquid fuel from fuel tank 360 having a lower alcohol concentration than fuel tank 370, is injected via a fuel injector coupled to an intake port of cylinder 14.

For example, the gasoline liquid phase fuel 360b, via fuel line 386a, can be pumped by fuel pump 388 and supplied to fuel rail 390 via liquid fuel conduit 386b. In this example, fuel pump 388 is electronically actuated by controller 12. The fuel rail 390 may be coupled to a series of port fuel injectors 167 shown in FIG. 1, which inject fuel into cylinder intake ports.

In order to reduce evaporative emissions and utilize the gasoline vapor phase fuel 360a, fuel vapor is initially collected and stored within a charcoal canister 392. Vapor phase fuel 360a progresses to charcoal canister 392 via gas conduit 394a. During purging of the charcoal canister 392 (as discussed below), air is drawn through charcoal canister 392 via air pipe 398 in order to extract the stored vapor phase fuel 360*a* from charcoal canister 392. This vapor-rich air may be supplied to engine 10 via conduit 394*b* and valve 396 along with additional liquid-phase fuel 360*b* from the fuel injectors. Vapor phase fuel 360*a* is released into intake manifold 146.

Additionally, the alcohol liquid phase fuel 370*b*, may be supplied to fuel pump 376 via fuel line 374*a*. Fuel line 374*b* carries fuel from fuel pump 376 to fuel rail 378. In this example, fuel pump 376 is electronically actuated by controller 12. The fuel rail 378 may be coupled to a series of direct fuel injectors 166, which inject fuel directly into combustion chamber 14.

In order to reduce evaporative emissions and utilize the alcohol vapor phase fuel 370*a*, it is initially collected and stored within a charcoal canister 380. Vapor phase fuel 370*a* is directed to charcoal canister 380 via gas conduit 382*a*. During fuel vapor purging, air is drawn through charcoal canister 380 via air pipe 397 in order to extract the stored vapor phase fuel 370*a*. Vapor-rich air is directed to engine 10 via gas conduit 382*b* and valve 384. Liquid-phase fuel 370*b* may also be supplied to engine cylinders via direct fuel injectors. Vapor phase fuel 370*a* is released into intake manifold 146.

The charcoal canisters 380 and 392 store vapor phase fuels of different types, such as the various vapors described herein. Charcoal canisters are equipped with adsorbent material, such as, activated carbon, in order to adsorb fuel vapors. Because air pipes 397 and 398 are in fluidic communication with charcoal canisters 380 and 392, respectively, the vacuum in the engine intake manifold 146 can draw air through charcoal canisters 380 and 392 when the purge valves 384 and 396, respectively, are open. The timing of the fuel injection by both the direct 166 and port 167 injectors may be applied in such a way as to utilize the charge cooling effects of the fuels, thereby reducing knock limits on engine operation, as described below.

It should be noted that the fuel system described in FIG. 3 may be extended to N number of fuel tanks supplying fuel to the engine. For example, five fuel tanks may supply different fuels to the engine. The five fuel tanks may include fuel tanks where different fuel types are separated, and the different fuel types are directed to other fuel tanks so as to provide a wide range of fuel types to the engine. Each fuel tank is in fluidic communication with a sole fuel vapor storage canister, the number of fuel vapor canisters is equal to the number of fuel tanks, and each fuel vapor storage canister is in fluidic communication with a sole fuel tank.

Referring now to FIG. 4, a flowchart of an example purge control strategy for multiple fuels and multiple fuel vapor storage canisters is shown. The flowchart of FIG. 4 may be implemented as executable instructions stored in non-transitory memory of controller 12 shown in FIG. 1. The method may be applied to the system shown in FIGS. 1-3.

At 402, method 400 judges whether or not to purge fuel from one or more fuel vapor storage canisters. In one example, purging from one or more fuel vapor storage canisters may be initiated in response to a concentration of vapors in a fuel vapor storage canister. Additionally, fuel vapors may be purged from one or more fuel vapor storage canisters in response to a combination or sub-combination of engine operating conditions or vehicle operating condition. For example, one or more fuel vapor canisters may be purged in response to refilling a fuel tank and ambient air temperature. If method 400 judges that conditions are present to purge one or more fuel vapor storage canisters, the answer is yes and method 400 proceeds to 404. Otherwise, the answer is no and method 400 proceeds to exit.

At 404, method 400 judges whether or not all fuel vapor canisters are to be purged based on the amount of fuel vapors stored within the fuel vapor storage canisters. In one example, method 400 judges that all fuel vapor storage canisters are to be purged based on the amount of fuel vapors stored within the fuel vapor storage canisters when there is expected to be less than a threshold amount of time to purge all fuel vapor storage canisters. Purging all fuel vapor storage canisters based on amounts of fuel vapors stored in the respective fuel vapor canisters allows method 400 to purge fuel vapors from canisters in a short time period. If method 400 judges that all fuel vapor storage canisters are to be purged based on the amount of fuel vapors stored within the fuel vapor storage canisters, the answer is yes and method 400 proceeds to 406. Otherwise, the answer is no and method 400 proceeds to 450.

At 406, method 400 quantifies the fullness, or the amount of fuel stored in each fuel vapor canister with respect to the amount of fuel vapor storage capacity of each fuel vapor canister. For example, if a fuel vapor canister has capacity to store 0.1 grams of fuel vapor and it is estimated that 0.01 grams of fuel vapor are stored in the fuel vapor storage canister, the fuel vapor storage canister is 10% full. The fullness of each fuel vapor storage canister in the fuel system may be determined in this way.

The amount of fuel vapors stored in each fuel vapor canister may be estimated based on fuel type and amount of liquid fuel stored in a fuel tank that is in fluidic communication with the fuel vapor canister for which fuel vapor amount is being estimated. Further, the amount of fuel vapor stored in a fuel vapor storage canister may be estimated based further on ambient air temperature and pressure, degree of fuel separation achieved before the engine is in an off state, soak time (e.g., time the engine is off), and soak conditions (e.g., ambient barometric pressure, ambient temperature, etc.), and/or fluctuations in these parameters (e.g. number of diurnal temperature cycles). In one example, an amount of fuel vapor stored in a fuel vapor storage canister may be based on empirically determined fuel vapor storage data that is indexed via the previously mentioned conditions. Method 400 proceeds to 408 after the fullness of each fuel vapor storage canister in the fuel system is determined.

At 408, method 400 modulates each purge control valve regulating purge flow between a fuel vapor storage canister and the engine. Each of the purge control valves is modulated based on the fullness of a fuel vapor storage canister that the respective purge control valve is in fluidic communication with. For example, charcoal canister 392 of FIG. 3 may be "X %" full and charcoal canister 380 of FIG. 3 may be "Y %" full. The fraction of the total purge flow from canister 392 is X/(X+Y). The fraction of the total purge flow from canister 380 is Y/(X+Y), where the numerator is the percentage full of the canister having its purge rate adjusted, and where the denominator is the sum of percentages full of all canisters being purged. The total purge flow may be based on engine operating conditions. For example, based on engine speed and driver demand torque, method 400 may request 0.05 grams/minute of purge flow. If X is 10% and Y is 20%, the flow rate from charcoal canister 392 is (0.1/(0.1+0.2))·0.05=0.0166 grams/minute. The flow rate from charcoal canister 380 is (0.2/(0.1+0.2))·0.05=0.0333 grams/minute. If a different number of fuel tanks were present, then the purge control strategy is adjustable to the number of fuels and purging devices, such that the sum purging from all fuel vapor storage canisters is equal to the desired purge flow rate. Method 400 proceeds to 410 after purging of fuel vapor storage canisters is initiated.

It should be noted that as the charcoal canister purging occurs, oxygen sensors in the exhaust system provide feedback as to the air-fuel ratio in engine cylinders. The air-fuel ratio includes fuel from fuel vapor storage canister purging. Controller 12 shown in FIG. 1 adjusts the supply of liquid fuel based on information from the oxygen sensors. For example, if the engine is operating richer than desired, the amount of liquid fuel injected is reduced to drive the engine air-fuel ratio to a stoichiometric air-fuel ratio.

At 410, method 400 judges whether or not engine knock is present during purging of all fuel vapor storage canisters based on the fullness of fuel vapor storage canisters. Knock may be sensed via a knock sensor or an in cylinder pressure sensor. If engine knock is present, the answer is yes and method 400 proceeds to 412. Otherwise, the answer is no and method 400 proceeds to exit.

At 412, method 400 compares the fraction of higher octane fuel vapor from one of the fuel vapor storage canisters (e.g., the canister storing the fuel having a highest octane number) to the fraction of higher octane liquid phase fuel supplied to the engine. For example, if 0.1 gram/minute of higher octane liquid phase fuel is supplied to the engine from a first fuel tank and 0.9 grams/minute of lower octane liquid phase fuel is supplied to the engine from a second fuel tank, the higher octane liquid phase fraction is 10% (e.g., 0.1/(0.1+0.9)) of the total liquid phase fuel and the lower octane liquid phase fraction is 90% (e.g., 0.9/(0.1+0.9)). Further, if 0.003 gram/minute of higher octane vapor phase fuel is supplied to the engine via a first fuel vapor canister that is in fluidic communication with the first fuel tank and 0.009 grams/minute of lower octane vapor phase fuel is supplied to the engine via a second fuel vapor canister that is in fluidic communication with the second fuel tank, the higher octane vapor phase fraction is 25% of the total vapor phase fuel. Thus, the fraction of higher octane vapor phase fuel is greater than the fraction of higher octane liquid phase fuel (e.g., 25% is greater than 10%). Consequently, the answer at 412 would be no and method 400 would proceed to 420. If method 400 judges that the fraction of higher octane vapor phase fuel is less than the fraction of higher octane liquid phase fuel supplied to the engine, the answer is yes and method 400 proceeds to 414. Otherwise, the answer is no and method 400 proceeds to 420.

At 420, method 400 continues to purge fuel vapor canisters based on the fullness of each canister and engine knock is controlled via adjusting spark timing. For example, if knock is present in a cylinder, spark timing for the cylinder exhibiting knock is retarded a predetermined amount while other cylinders continue to receive spark at base timing. Method 400 proceeds to exit after spark timing is adjusted to control knock.

At 414, method 400 judges whether or not an amount of higher octane liquid phase fuel is greater than a threshold amount of fuel. If so, the answer is yes and method 400 proceeds to 416. Otherwise, the answer is no and method 400 proceeds to 418.

At 416, method 400 increases an amount of higher octane liquid phase fuel injected to the engine. At the same time, the amount of lower octane liquid phase fuel may be reduced so that the engine may operate at or near the same air-fuel ratio as before knock was sensed. Increasing the amount of higher octane fuel may reduce the propensity for knock in the engine via combusting a fuel mixture having a higher octane number. Further, if the higher octane fuel is directly injected and the lower octane fuel is port injected, injecting additional higher octane fuel may increase charge cooling and reduce the propensity for engine knock. Method 400 proceeds to exit after additional higher octane fuel is supplied to the engine.

At 418, method 400 reduces the amount of purging. In particular, the purge rate for all fuel vapor storage canisters is reduced. For example the purge rate may be reduced from 0.05 grams/minute to 0.02 grams/minute. By reducing the rate of purge, additional amounts of higher and lower octane liquid phase fuel may be provided to the engine so that the charge (e.g., fuel and air) temperature may be lowered to reduce the possibility of engine knock. Method 400 proceeds to exit after the purge rate is reduced.

At 450, method 400 quantifies the relative fractional amounts of higher and lower octane liquid phase fuel supplied to the engine. The fractional amounts of higher and lower octane liquid phase fuel supplied to the engine may be determined as described at 412. Fuel fractions for a system including greater than two fuel tanks and two fuel vapor storage canisters may be determined in a similar manner. Method 400 proceeds to 452 after the fractional amounts of higher and lower octane fuels are determined.

At 452, method 400 determines which fuel vapor storage canisters in the fuel system are to be purged of fuel vapor. In one example, method 400 selects fuel vapor storage canisters to be purged based on amounts of fuel vapor stored in the fuel vapor storage canister. For example, fuel vapor canisters that have stored more than 0.01 grams of fuel vapor are purged. Method 400 may select all or a fraction of a total number of fuel vapor canisters to be purged. Method 400 proceeds to 454 after fuel vapor storage canisters are selected to be purged of fuel vapors.

At 454, method 400 judges whether or not all fuel vapor storage canisters in the fuel vapor system are to be purged of fuel vapor. If method 400 has selected less than the total number of fuel vapor canisters in the fuel system to be purged at 452, the answer is not and method 400 proceeds to 456. Otherwise, the answer is yes and method 400 proceeds to 458.

At 458, method 400 modulates purge valves between fuel vapor storage canisters and the engine so that fuel vapors drawn from the fuel vapor storage canisters to the engine are supplied in a same proportional fraction as corresponding liquid fuel is supplied to the engine. For example, if 0.1 gram/minute of higher octane liquid phase fuel is supplied to the engine from a first fuel tank and 0.9 grams/minute of lower octane liquid phase fuel is supplied to the engine from a second fuel tank, the higher octane liquid phase fraction is 10% (e.g., 0.1/(0.1+0.9)) of the total liquid phase fuel and the lower octane liquid phase fraction is 90% (e.g., 0.9/(0.1+0.9)). Therefore, if the desired purge flow is 0.05 grams/minute, the purge valve leading from the higher octane fuel vapor canister to the engine, the higher octane fuel vapor canister being in fluidic communication with the higher octane fuel tank, is modulated to provide 0.005 grams/minute of flow from the higher octane fuel vapor canister to the engine. Correspondingly, 0.045 grams/minute, or 90% of the desired purge flow of 0.05 grams/minute is provided via modulating the purge valve leading from the lower octane fuel vapor canister to the engine, the lower octane fuel vapor canister being in fluidic communication with the lower octane fuel tank.

Thus, if engine 10 is consuming "X %" low-octane liquid phase fuel 360b, and "Y %" high-octane liquid phase fuel 370b, then the fraction of the vapor phase purge would be X % from canister 392 and Y % from canister 380, where X %+Y %=100%. If a different number of fuel tanks were present, the purge control strategy is amendable to the number of fuels and purging devices, such that the sum of the liquid phase fuel usage from all of the fuel tanks is 100%. Method 400 proceeds to 460 after modulation of purge valves is initiated.

At 456, method 400 modulates purge valves so that fuel vapors drawn from each fuel vapor storage canister selected to be purged is proportional to a fraction of corresponding liquid fuel supplied to the engine, but excluding fuel vapor storage canisters that are not being purged. For example, if engine 10 is using "X %" low-octane liquid phase fuel 360b and "Y %" high-octane liquid phase fuel 370b, and "Z %" of a third liquid phase fuel (not shown), then the vapor phase purge would be X % from charcoal canister 392, Y % from charcoal canister 380, and Z % from the third charcoal canister (not shown). However, if one or more of the canisters do not need purging, then not all of the canisters will be purged at 456. The charcoal canisters to be purged at 456 will be modulated proportionally to the liquid phase fuel usage. For example, if engine 10 is using "X %" low-octane liquid phase fuel 360b, "Y %" high-octane liquid phase fuel 370b, and "Z %" of a third liquid phase fuel, but the third charcoal canister does not need purging, then the fraction of the vapor phase purge from charcoal canister 392 would be X/(X+Y) and from charcoal canister 380 would be Y/(X+Y). If a different number of fuel tanks were present, the purge control strategy is adjustable to the number of fuels and purging devices. Method 400 proceeds to 460 after fuel vapor storage purging begins.

At 460, method 400 judges whether or not engine knock is present during purging of fuel vapor storage canisters. If engine knock is present, the answer is yes and method 400 proceeds to 462. Otherwise, the answer is no and method 400 proceeds to exit.

At 462, method 400 judges whether or not only fuel vapor canisters storing non-higher octane being purged. If so, the answer is yes and method 400 proceeds to 466. Otherwise, the answer is no and method 400 proceeds to 464.

At 464, method 400 continues to purge fuel vapor canisters based on the injection fraction of the corresponding liquid fuel, and engine knock is controlled via adjusting spark timing. For example, if knock is present in a cylinder, spark timing for the cylinder exhibiting knock is retarded a predetermined amount while other cylinders continue to receive spark at base timing. Method 400 proceeds to exit after spark timing is adjusted to control knock.

At 466, method 400 judges whether or not an amount of higher octane liquid phase fuel is greater than a threshold amount of fuel. If so, the answer is yes and method 400 proceeds to 468. Otherwise, the answer is no and method 400 proceeds to 470.

At 470, method 400 reduces the amount of purging. In particular, the purge rate for all fuel vapor storage canisters is reduced. For example the purge rate may be reduced from 0.05 grams/minute to 0.02 grams/minute. By reducing the rate of purge, additional amounts of higher and lower octane liquid phase fuel may be provided to the engine so that the charge (e.g., fuel and air) temperature may be lowered to reduce the possibility of engine knock. Method 400 proceeds to exit after the purge rate is reduced.

At 468, method 400 increases an amount of higher octane liquid phase fuel injected to the engine. At the same time, the amount of lower octane liquid phase fuel may be reduced so that the engine may operate at or near the same air-fuel ratio as before knock was sensed. Increasing the amount of higher octane fuel may reduce the propensity for knock in the engine via combusting a fuel mixture having a higher octane number. Further, if the higher octane fuel is directly injected and the lower octane fuel is port injected, injecting additional higher octane fuel may increase charge cooling and reduce the propensity for engine knock. Method 400 proceeds to exit after additional higher octane fuel is supplied to the engine.

Now referring to FIG. 5, a method for controlling engine air-fuel ratio in the presence of purging of fuel vapor storage canisters is shown. The method of FIG. 5 may be incorporated into the system of FIGS. 1-3. The flowchart of FIG. 5 may be implemented as executable instructions stored in non-transitory memory of controller 12 shown in FIG. 1.

At 502, method 500 adjusts the total amount of fuel supplied to the engine in response to driver demand torque, engine speed, and desired fuel modulation. The total amount of fuel includes liquid fuel through the injectors and vapor fuel from the canisters. In one example, engine speed, driver demand torque indexes a table of empirically determined fuel amounts, and the fuel amount is output from the table. In some examples, the driver demand torque may be converted to an engine air amount, and the engine air amount may be multiplied by a desired engine fuel-air ratio to establish an engine fuel amount. The fuel amount may be adjusted to promote catalyst activity by adding a fuel modulation amount to the engine fuel amount. Method 500 proceeds to 504 after determining the total engine fuel amount.

At 504, method 500 begins to deliver the engine liquid fuel amount to the engine. The liquid fuel amount is adjustable via changing a fuel pulse width applied to fuel injectors. Fuel may be injected to a cylinder via two injectors as shown if FIG. 1. The amounts of different fuels injected to the engine may be adjusted to operate the engine about a stoichiometric air-fuel ratio that varies depending on the type of fuel injected to the engine. In some examples, the liquid fuel amount at 504 may be equal to the total amount of fuel from 502. In other examples, the liquid fuel amount may be less than the total amount of fuel from 502, the difference being calculated based on an open-loop estimate of the amount of vapor fuel to be delivered from the fuel vapor canisters. Method 500 proceeds to 506 after the amount of fuel injected is adjusted via adjusting fuel injector pulse widths.

At 506, method 500 begins to supply vapor phase fuel from the fuel vapor storage canisters. The vapor phase fuel is introduced to the engine intake manifold. In some examples, the amount of fuel supplied to the engine in the vapor phase may be estimated based on output of a hydrocarbon sensor and the fuel vapor flow rate. In other examples, the amount of vapor phase fuel may be inferred based on previous operating conditions, or no estimate of vapor phase fuel may be provided. Method 500 proceeds to 508 after vapor phase fuel is provided to the engine.

At 508, method 500 determines the actual engine air-fuel ratio based on output from one or more exhaust gas sensors. In particular, output from an exhaust sensor is input to a transfer function and air-fuel ratio is output from the transfer function. Method 400 proceeds to 510 after engine air-fuel ratio is determined.

At 510, method 500 adjusts the fuel injector pulse widths in response to a difference between a desired engine air-fuel ratio determined at 502 and the actual engine air-fuel ratio determined at 508. In one example, the fuel injector pulse width is adjusted in proportion to an error between the desired and actual engine air-fuel ratios. Since the actual engine air-fuel ratio includes fuel from purging fuel vapor storage canisters, fuel injector pulse widths are adjusted to compensate for fuel provided to the engine via the fuel vapor storage canisters. In this way, the engine air-fuel ratio may be adjusted in a closed-loop manner. Method 500 proceeds to exit after fuel injector pulse widths are adjusted to drive the actual engine air-fuel ratio toward the desired engine air-fuel ratio.

Thus, the method of FIGS. 4 and 5 provide for controlling an engine supplied with multiple fuels, comprising: controlling vapor purge flow into the engine from multiple vapor storage devices each in fluidic communication with a respective, but equal number of multiple fuel tanks, each of the multiple vapor purge flows controlled to have a same proportion of total vapors purged as a proportion of liquid fuel delivered to the engine from the respective multiple fuel tanks. The method includes where liquid phase fuel from one of said fuel tanks containing a fuel having a highest octane rating of all other of said multiple fuel tanks is directly injected into a combustion chamber of the engine through an injector in direct fluidic communication the combustion chamber.

In some examples, the method includes where liquid fuel from one of the multiple fuel tanks other than the fuel tank having the highest octane rating is injected through a fuel injector in fluidic communication with an intake port of the combustion chamber. The method includes where a vapor storage device in fluidic communication to the fuel tank having the highest octane fuel has fuel vapor with higher octane than all other of the multiple vapor storage devices. The method further comprises feedback control responsive to an exhaust gas oxygen sensor to adjust said fuel delivered from the multiple fuel tanks to the engine to maintain engine air-fuel ratio around stoichiometry. The method also includes where the feedback control adjusts liquid fuel delivered to the engine while the multiple vapor storage devices are purging fuel vapors into the engine to maintain overall engine air-fuel ratio around stoichiometry or other desired air-fuel ratio. The method includes where the highest octane fuel is separated from a fuel blend on board a vehicle powered by the engine, and where there are two fuel tanks and two vapor storage canisters, or three fuel tanks and three vapor storage canisters.

In another example the methods of FIGS. 4 and 5 provide for controlling an engine supplied with multiple fuels, comprising: adjusting a plurality of purge flows from a plurality of fuel vapor storage canisters in response to a plurality of fuel fractions comprising an amount of liquid fuel injected to an engine. The method includes where the plurality of purge flows is adjusted via modulating a plurality of purge valves. The method includes where at least one of the plurality of purge flows originates from a fuel vapor canister, the fuel vapor canister being in fluidic with a sole fuel tank, and where one of the plurality of fuel fractions is based on an amount of fuel delivered to the engine from the sole fuel tank. The method also includes where the one of the plurality of fuel fractions is the basis for adjusting the at least one of the plurality of purge flows. The method further comprises adjusting at least one of the plurality of purge flows in response to an indication of engine knock. The method also includes where adjusting the at least one of the plurality of purge flows includes decreasing the at least one of the plurality of purge flows.

The methods of FIGS. 4 and 5 also provide for controlling an engine supplied with multiple fuels from multiple fuel tanks and purging fuel vapors into the engine from multiple vapor storage canisters each coupled to a respective one of an equal number of the multiple fuel tanks, comprising: adjusting a purge flow from each of the multiple vapor storage canisters to be a ratio of an amount of fuel vapor stored in each of the multiple vapor storage canisters to a total amount of fuel vapor stored in all of the multiple vapor storage canisters. The method further comprises feedback control responsive to an exhaust gas oxygen sensor to adjust the fuel delivered from the multiple fuel tanks to the engine to maintain engine air-fuel ratio around stoichiometry. The method includes where the feedback control adjusts liquid fuel delivered to the engine while the vapor canisters are purging fuel vapors into the engine to maintain overall engine air-fuel ratio around stoichiometry. The method includes where one of the fuels comprises ethanol or an ethanol blend.

In some examples, the method further comprises estimating fuel vapor stored in each of the multiple vapor storage canisters based on liquid level in each of the respective multiple fuel tanks, degree of fuel separation achieved before the engine is in an off state, time the engine is in the off state, ambient temperature, and pressure/temperature history of each of the multiple fuel tanks. The method includes where a higher ethanol content fuel is directly injected into a combustion chamber of the engine through an injector in direct communication with a cylinder. The method also includes where a lower ethanol content fuel is injected through a fuel injector in communication with an intake port of a cylinder.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations, methods, and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine supplied with multiple fuels, comprising:
   controlling fuel vapor purge flow into the engine from multiple vapor storage devices each in fluidic communication with a respective, but equal number of multiple fuel tanks, each of the multiple vapor purge flows controlled to have a same proportion of total vapors purged as a proportion of liquid fuel delivered to the engine from the respective multiple fuel tanks; and reducing a mass flow rate from the multiple vapor storage devices in response to engine knock.

2. The method of claim 1, where liquid phase fuel from one of said fuel tanks containing a fuel having a highest octane rating of all other of said multiple fuel tanks is directly injected into a combustion chamber of the engine through an injector in direct fluidic communication the combustion chamber, and further comprising increasing an amount of liquid fuel injected in response to the engine knock in place of reducing the mass flow rate from the multiple vapor storage devices when an amount of higher octane liquid phase fuel is greater than a threshold amount.

3. The method of claim 2, where liquid fuel from one of the multiple fuel tanks other than the fuel tank having the highest octane rating is injected through a fuel injector in fluidic communication with an intake port of the combustion chamber.

4. The method of claim 2, where a vapor storage device in fluidic communication to the fuel tank having the highest octane fuel has fuel vapor with higher octane than all other of the multiple vapor storage devices.

5. The method of claim 1, further comprising feedback control responsive to an exhaust gas oxygen sensor to adjust said fuel delivered from the multiple fuel tanks to the engine to maintain engine air-fuel ratio around stoichiometry.

6. The method of claim 5, where the feedback control adjusts liquid fuel delivered to the engine while the multiple vapor storage devices are purging fuel vapors into the engine to maintain overall engine air-fuel ratio around stoichiometry.

7. The method of claim 2, where the highest octane fuel is separated from a fuel blend on board a vehicle powered by the engine, and where there are two fuel tanks and two vapor storage canisters, or three fuel tanks and three vapor storage canisters.

8. A method for controlling an engine supplied with multiple fuels, comprising:

adjusting a plurality of purge flows from a plurality of fuel vapor storage canisters in response to a plurality of fuel fractions comprising an amount of liquid fuel injected to the engine when there is greater than a threshold amount of time to purge the plurality of fuel vapor storage canisters; and adjusting the plurality of purge flows proportionate to fullness of the plurality of fuel vapor storage canisters when there is less than the threshold amount of time to purge the plurality of fuel vapor storage canisters.

9. The method of claim 8, where the plurality of purge flows is adjusted via modulating a plurality of purge valves, and further comprising reducing a mass flow rate from the plurality of fuel vapor storage canisters in response to engine knock.

10. The method of claim 8, where at least one of the plurality of purge flows originates from a fuel vapor canister, the fuel vapor canister being in fluidic with a sole fuel tank, and where one of the plurality of fuel fractions is based on an amount of fuel delivered to the engine from the sole fuel tank.

11. The method of claim 10, where the one of the plurality of fuel fractions is the basis for adjusting the at least one of the plurality of purge flows.

12. The method of claim 8, further comprising adjusting at least one of the plurality of purge flows in response to an indication of engine knock.

13. The method of claim 12, where adjusting the at least one of the plurality of purge flows includes decreasing the at least one of the plurality of purge flows.

14. A method for controlling an engine supplied with multiple fuels from multiple fuel tanks and purging fuel vapors into the engine from multiple vapor storage canisters each coupled to a respective one of an equal number of the multiple fuel tanks, comprising:

adjusting a purge flow from each of the multiple vapor storage canisters to be a ratio of an amount of fuel vapor stored in each of the multiple vapor storage canisters to a total amount of fuel vapor stored in all of the multiple vapor storage canisters.

15. The method of claim 14, further comprising feedback control responsive to an exhaust gas oxygen sensor to adjust the fuel delivered from the multiple fuel tanks to the engine to maintain engine air-fuel ratio around stoichiometry, and further comprising decreasing the purge flow in response to engine knock.

16. The method of claim 15, where the feedback control adjusts liquid fuel delivered to the engine while the vapor canisters are purging fuel vapors into the engine to maintain overall engine air-fuel ratio around stoichiometry, and further comprising increasing an amount of liquid fuel injected in response to the engine knock in place of decreasing the purge flow when an amount of higher octane liquid phase fuel is greater than a threshold amount.

17. The method of claim 14, where one of the fuels comprises ethanol or an ethanol blend.

18. The method of claim 14, further comprising estimating fuel vapor stored in each of the multiple vapor storage canisters based on liquid level in each of the respective multiple fuel tanks, degree of fuel separation achieved before the engine is in an off state, time the engine is in the off state, ambient temperature, and pressure/temperature history of each of the multiple fuel tanks.

19. The method of claim 17, where a higher ethanol content fuel is directly injected into a combustion chamber of the engine through an injector in direct communication with a cylinder.

20. The method of claim 17, where a lower ethanol content fuel is injected through a fuel injector in communication with an intake port of a cylinder.

* * * * *